United States Patent [19]

Herron et al.

[11] Patent Number: 5,281,430
[45] Date of Patent: Jan. 25, 1994

[54] OSMOTIC CONCENTRATION APPARATUS AND METHOD FOR DIRECT OSMOTIC CONCENTRATION OF FRUIT JUICES

[75] Inventors: John R. Herron; Edward G. Beaudry; Carl E. Jochums; Luis E. Medina, all of Corvallis, Oreg.

[73] Assignee: Osmotek, Inc., Corvallis, Oreg.

[21] Appl. No.: 986,921

[22] Filed: Dec. 8, 1992

[51] Int. Cl.$^5$ .......................... A23P 1/00; B01D 63/00
[52] U.S. Cl. .............................. 426/490; 210/321.75; 210/644; 426/495
[58] Field of Search .................. 426/478, 490, 495; 210/321.75, 644

[56] References Cited

U.S. PATENT DOCUMENTS

| | | | |
|---|---|---|---|
| 2,116,920 | 5/1938 | Wickendon | 426/490 |
| 3,228,877 | 1/1966 | Mahon | 210/646 |
| 4,322,448 | 3/1982 | Matsuura et al. | 426/490 |
| 4,581,236 | 4/1986 | Bandel et al. | 426/592 |
| 4,664,918 | 5/1987 | Tilgner et al. | 210/644 |
| 4,787,982 | 11/1988 | Caro et al. | 210/644 |
| 4,804,554 | 2/1989 | Barth | 426/592 |
| 4,867,997 | 9/1989 | Weisenberger et al. | 426/493 |
| 4,988,525 | 1/1991 | Gresch | 426/490 |
| 5,075,123 | 12/1991 | Schwinghammer | 210/644 |
| 5,151,191 | 9/1992 | Sunaoka et al. | 210/644 |

OTHER PUBLICATIONS

Popper et al., Food Engineering 102-103, 1966.

Primary Examiner—George Yeung
Attorney, Agent, or Firm—Jeffrey B. Oster

[57] ABSTRACT

There is disclosed an osmotic concentration cell wherein the flow chamber of the osmotic concentration cell has a continually changing flow path to provide a region of high turbulence to a semipermeable membrane defining the flow chamber. High turbulence at a first semipermeable membrane interface significantly reduces membrane fouling during osmotic concentration and allows for concentration of products with high suspended solids content. The inventive osmotic concentration cell can be used for a variety of purposes including, for example, producing low alcohol wine, concentrating a thin wine into a premium wine, concentrating a low quality grape juice into a higher quality grape juice for fermenting a more premium wine, concentrating various fruit or vegetable juices, and concentrating various beverages, such as teas or coffee.

8 Claims, 7 Drawing Sheets

OSMOTIC CONCENTRATION APPARATUS AND METHOD FOR DIRECT OSMOTIC CONCENTRATION OF FRUIT JUICES

TECHNICAL FIELD OF THE INVENTION

The present invention relates to an osmotic concentration apparatus and osmotic concentration cell having a configuration which promotes turbulence at a first membrane surface to prevent fouling of the membrane surface. The cell may also be used as a dialysis cell. The present invention further relates to a method for making a low alcohol wine or other fermented beverage, a method for improving the quality of a wine beverage, a process to provide a grape juice concentrate from mid to early harvest grapes that can be used for a desert wine, and a method for improving the quality of a grape juice concentrate used for wine fermentation.

BACKGROUND OF THE INVENTION

Osmotic concentration cells are often used to concentrate food products, such as fruit juices, by selectively removing water. It has been recently found that many consumers are willing to pay a premium for high-quality fruit juices. This is evidenced by increased sales of single-strength products (i.e., products that have not been concentrated) in a market dominated by frozen concentrates. Therefore, there is a need in the art to be able to concentrate various food products by selectively removing only water, such that upon reconstitution, the product provides all the qualities of unconcentrated juice. This avoids the unnecessary expense of transporting excessive quantities of water.

In osmotic concentration cells, water diffuses from the food product to be concentrated through a semipermeable membrane into a solution having a much lower water content. Osmotic concentration systems are of interest to concentrate food products without use of heat that may damage the food product, such as a fruit juice. This prevents much of the quality degradation associated with evaporative processes. Food products of particular interest for osmotic concentration include other fruit and vegetable juices, agricultural products such as aloe vera, and pharmaceutical and biopharmaceutical products.

Most juice concentrates are made using evaporators. This is the source of quality problems with concentrates due to loss of volatile fragrances, denaturation and self-oxidation of the product. Volatiles are lost during the evaporative process because volatile agents have a lower boiling point than water. Some of the volatiles can be recovered by distillation of the vapor, however this system is, at best, only partially successful and it adds tremendous costs to the overall process. Loss of volatile degrades product quality because the volatile species are responsible for the fragrance associated with various products, such as fresh juice. Self oxidation is primarily a problem for juices. The term refers to enzymatic destruction of colors and flavors in the juice by naturally-occurring enzymes. The enzymes are derived from the juice and are largely inactive at refrigeration temperatures. However, such enzymes can become active at the higher temperatures associated with commercial evaporation.

Previous attempts to solve the problems of loss of volatiles and self-oxidation during concentration of juices include various cold concentration techniques. For food products, cold techniques include freeze concentration, reverse osmosis (RO) and direct osmotic concentration (DOC). Freeze concentration can eliminate self-oxidation problems and produce a higher quality juice than evaporators. However there are problems associated with freeze concentration, including: (1) only clarified juices can be concentrated, (2) some minor juice constituents are lost, and (3) capital costs of a commercial scale freeze concentration plant is many times that of an evaporation plant. Accordingly, the costs for freeze concentration are prohibitive, making this process not economically feasible.

RO techniques have lower capital and operating costs than freeze concentration. However, RO capital costs still far exceed evaporation techniques capital and operating costs. RO operates by squeezing water out of a juice through a semipermeable membrane (a thin polymer which has been manufactured to be porous). In semipermeable membranes, the pore structure is small enough that small molecules, such as water, can pass through, while larger organic molecules are prevented from passing. Drawbacks to RO are that the membranes foul rapidly and extremely high pressures (e.g., 3000 psi) are needed to form a juice concentrate.

Direct osmotic concentration (DOC) has been studied less than other cold concentration processes. DOC uses semipermeable membranes. However, instead of squeezing water out with pressure, DOC uses a solution with a lower mole fraction of water to pull water out of a product. This solution with a low mole fraction of water is an osmotic agent (OA). In DOC, any water pulled from the product into the OA must be subsequently removed from the OA, preferably by evaporation, in order for the OA to be recycled. Evaporation of the OA does not effect product quality because the product itself is not heated. Since DOC requires an evaporation step, its energy requirement is similar to evaporative concentration.

Concentrating products containing large organic molecules and solutions with suspended solids (e.g., pulp from orange juice) creates severe membrane fouling problems, particularly in RO systems. Even when a product is first filtered to remove suspended solids, there is severe fouling due to deposition of films on the surfaces of the semipermeable membrane. Such films are composed of large molecules such as polypeptides, pectins and polysaccharides. Large organic molecules adhere to the surface of the membrane due to Van der Waals attraction. After attachment, the large molecules slowly denature and unfold and then form multiple hydrogen bonding and multiple ionic interactions with the membrane. Therefore, it is desirable to induce a high degree of turbulence at the membrane surface to sweep these molecules away from the membrane surface before they adhere due to stronger bond formation.

Film breakup in RO systems has been attempted in, for example, Cross, "Membrane Concentration of Orange Juice" Proc. Fla. State Hort. Soc. 102, 1989. If the velocity is kept above 1 m/sec in tubular RO systems, enough turbulence is produced that may unfiltered juices can be concentrated up to 30% dissolved solids (30 Brix). Above 30 Brix, turbulence can no longer pull attached molecules away from membrane pores because pressures needed to push water out of the juice at Brix levels above 30 (i.e., greater than 5 MPa) produce pressure gradients at surfaces of membranes greater than 1000 GPa/m. Tubular RO is the RO configuration most resistant to fouling, but requires the greatest amount of space. Plate and frame configurations have greater surface fouling, but are more economical systems to build. Hollow fiber configurations are most susceptible to fouling.

Another method for concentrating juices to a high Brix level in an RO system first removes all large molecules by ultrafiltration before RO concentration. This method allows for concentration of a 60 Brix juice. However this method is relatively expensive, is difficult to maintain in view of the ultrafiltration step, and is energy intensive.

Flux of water in both RO and DOC systems is controlled by both pressure and osmotic concentration gradients. This can be quantified as:

$$F_w = k_w[(P^I - q^I) - (P^{II} - q^{II})]$$

wherein $F_w$ is the water flux, $k_w$ is a constant for flux through a particular membrane, P is pressure, q is the osmotic potential and the I and II superscripts refer to solutions on each side of the membrane. Osmotic potential is a measure of the tendency of water to diffuse through a membrane from a region of high water concentration to a region of lower water concentration. In general, a good approximation of osmotic potential is $q = cRT$, wherein c is the molar concentration of non-water species in a solution, R is a gas constant, and T is the absolute temperature.

In RO systems, pressure differences are large but the osmotic potential of a permeate (the solution water is pushed into) is essentially zero. In DOC systems, pressure differences are negligible and flux depends on the difference in osmotic potential. In RO systems, the value of the flux constant $k_w$ is determined by molecular scale hydrodynamic resistance to flow through the membrane pores. To minimize this resistance, RO systems use extremely thin membranes (e.g., less than 0.01 mm thick) supported by a porous backing wherein the backing provides structural properties to the membrane to be able to withstand high applied pressure. The pores in the back are much larger than pores in the membrane, hence the backing contributes little to flow resistance across the membrane.

DOC $k_w$ values are primarily controlled by diffusion rates. Diffusion rates are less dependent upon pore diameter than hydrodynamic flow rates. Thus, in DOC cells, the presence of a membrane backing can severely reduce flux rates. Therefore, DOC membranes and their backings, if any, must be as thin as possible.

Further resistance to water flux in DOC systems occurs due to boundary layers on the surfaces of membranes. Boundary layers are thin regions in the fluid next to a membrane surface where mixing with bulk fluid is ineffective. An impact of boundary layers is creation of an extra region that water must diffuse through. Boundary layers are often avoided by using high fluid velocity (turbulent flow if possible) to sweep away boundary layers. Therefore, it is important in this art to design a flow cell configuration to avoid dead spots in fluid flow near membranes. The present invention was made, in part, to solve some of the problems of DOC systems for juice concentrators and dialysis systems.

In the wine industry, there is a need to provide a low alcohol wine to have an alcohol content below 10% to satisfy certain governmental regulations and to satisfy a consumer demand for a wine beverage with full bodied taste and body with less alcohol. There is also a need in the wine industry to improve thin wine fermentations that sometime result and produce a low grade wine. If a thin, low grade wine could be concentrated in both its water and alcohol contents, then it could be transformed into a premium wine and command a higher market price. There is also a need to improve the quality of various grape juices used for wine fermentation to use a lower grade juice to make a premium wine. The use of the inventive device according to the inventive process can satisfy these wine industry needs.

There are a number of processes for reducing the alcohol content of fermented drinks, such as wine, beer and champagne. One technique subjects the fermented drink to fractional distillation (usually under a vacuum) in order to remove some ethanol. Fractional distillation usually removes some of the taste and aroma substances from the drink and usually requires addition back to the drink of taste and aroma substances removed. In spite of extraordinary efforts involved in fractional vacuum distillation and rapid evaporators (e.g., thin film evaporators) this process produces poor quality products because the product often does not have the same or nearly the same taste as the original product. In another process, ethanol in a fermented drink may be extracted by means of organic solvents. However, use of organic solvents in this manner would violate many food processing regulations and the taste of the drink is often severely affected. It is known that the flavorings and aroma agents that form the bouquet and other such substances of a wine beverage include about 400 to 600 different substances, such as higher alcohols, esters, aldehydes, ketones, lactones, etc. The total volume of such substances is only about 0.5% to about 1% of the wine volume. However many of these substances are volatile with their boiling points being below and above the boiling point for ethanol. These substances also overlap the corresponding properties of ethanol with regard to their extraction behavior.

Most recent efforts for producing low alcohol beverages have focused upon a dialysis technique to lower alcohol content across a membrane. For example, in U.S. Pat. No. 4,804,554, a hydrophillic membrane is used and the osmotic agent (OA) or "dialysate" is composed of fractionally distilled beverage without alcohol or flavor substances. After each use, the dialysate is "stripped" of alcohol (and other flavoring agents) by fractional distillation. In U.S. Pat. No. 4,581,236 the dialysate is again the alcohol-free beverage. In U.S. Pat. No. 4,664,918, the dialysate is the alcohol-free beverage or an alcohol-free fruit beverage. Use of a dealcoholized product as the OA, however, tends to dilute the product being dialyzed. This happens because removal of alcohol from the juice to be used as the OA lowers the osmotic potential of the solution, with the result that when the OA is introduced into the membrane cell, water is pulled from it into the dealcoholized product.

Dilution of fermented beverages during alcohol removal is undesirable because, by itself, removal of alcohol decreases the sensory impact of beverage flavors. A dilution of the product further decreases product flavor.

In another technique, U.S. Pat. No. 4,867,997 describes a complicated high-pressure extraction process in the presence of carbon dioxide in a supercritical fluid state. Therefore, there is a need in the art to find an improved process to make a low alcohol fermented beverage (e.g., wine, beer or champagne) that retains the flavor and aroma characteristics of the original beverage. The present invention was made to achieve such a goal.

SUMMARY OF THE INVENTION

The present invention provides an osmotic concentration cell and an osmotic concentration apparatus (comprising an array or plurality of osmotic concentration cells), wherein each cell has a first chamber with a fluid flow design with high turbulence at a first semipermeable membrane surface wherein a flow path of the first chamber has a continual change in flow direction. The osmotic agent (OA) flows on the second side of the semipermeable membrane in a second chamber, preferably in a torturous path between support members, and in the same net direction as the flow and with a slightly lower pressure than the juice.

In order to accomplish this result, each osmotic concentration cell is designed comprising an enclosed apparatus having one or two semipermeable membranes per cell, each semipermeable membrane having a first side defining a first chamber and a second side defining a second chamber. The semipermeable membrane rests on support members (such as rod-shaped support members) spaced from about 1 cm to about 10 cm apart, wherein the support members are within the second chamber. There is a pressure difference between the juice or first chamber and the OA or second chamber wherein the pressure is greater in the first chamber. This pressure differential deflects the membrane between the support members into the second chamber so that a flow path with a continually changing direction is formed. This flow path is called "corrugated." The juice flow path is continually changing, in a "serpentine" pattern, wherein the radius of curvature of the juice flow path is from about 1.5 cm to about 4.5 cm depending upon the distance between the support members. Preferably, the radius of curvature is about 2.0 cm.

The osmotic concentration apparatus further comprises one or a plurality of enclosed cells having a flow inlet opening leading to the first chamber of each cell, a flow outlet communicating with the first chamber of each cell, an OA inlet and an OA outlet connected to each second chamber. The second chamber of an osmotic concentration apparatus is defined by internal walls of the osmotic concentration apparatus and the second sides of the semipermeable membranes.

The present invention further comprises a DOC method for selectively removing water from a juice in an osmotic concentration cell or apparatus, comprising: (a) providing a juice in a continuous flow stream to a juice inlet, (b) pumping the juice at a pressure of from about 1 to about 30 psi through a first chamber and out a juice outlet, and wherein the first chamber comprises a continually changing direction flow path, wherein the radius of curvature of the continually changing direction flow path is from about 1.5 cm to about 4.5 cm., (c) providing an OA in a second chamber, wherein the second chamber is defined by the second side of a semipermeable membrane and enclosed by the cell, and wherein the OA comprises the salt components of the juice at a molar concentration at least three times and preferably at least five times greater than the undiluted juice. Preferably, the OA further comprises at least 50 weight % of a sugar, wherein the sugar is selected from the group consisting of sucrose, fructose, maltose, glucose, and combinations thereof.

The present invention further comprises a method for improving the quality of a thin, low grade wine, comprising: (a) providing a thin, low grade wine composition to a juice inlet in an osmotic concentration apparatus described herein; (b) providing an OA to the OA chamber, wherein the OA comprises from about 30% to about 85% by weight sugar when the alcohol content of the OA is held near zero, or as little as 5% by weight sugar when the alcohol content of the OA is allowed to approach that of the product; (c) applying greater pressure to the wine than to the OA to deflect the semipermeable membrane into a corrugated flow path; (d) removing approximately equal percentage amounts of both alcohol and water; and (e) collecting an improved wine product. The inventive method further comprises recycling the OA by selectively distilling off alcohol and water to restore the original weight percentage of sugar in the OA. Preferably, the OA further comprises at least 1 mM of an organic acid. The organic acids in the OA are selected from the group consisting or malic acid, citric acid, tartaric acid, and combinations thereof.

The present invention further provides a process for improving the quality of a fruit juice used to make a wine, comprising: (a) providing a thin, low grade fruit juice composition to a juice inlet in an osmotic concentration apparatus described herein; (b) providing an OA to the OA chamber, wherein the OA comprises from about 50% to about 752% by weight sugar; (c) applying greater pressure to the fruit juice than to the OA to deflect the semipermeable membrane into a corrugated flow path; (d) removing water from the fruit juice; and (e) collecting an improved fruit juice product. The inventive method further comprises recycling the OA by selectively distilling off water to restore the original weight percentage of sugar in the OA. Preferably, the OA further comprises at least 1 mM of an organic acid. The organic acids in the OA are selected from the group consisting or malic acid, citric acid, tartaric acid, and combinations thereof.

The present invention further provides a process to make a grape juice that can be used for a desert wine by concentrating the grape juice to about 36 to about 40 degree Brix from a grape juice from "fully ripe" grapes (i.e., approximately 23 degrees Brix) by a process comprising: (a) providing a grape juice composition from fully ripe grapes to a juice inlet in an osmotic concentration apparatus described herein; (b) providing an OA to the OA chamber, wherein the OA comprises from about 50% to about 75% by weight sugar; (c) applying greater pressure to the grape juice than to the OA to deflect the semipermeable membrane into a corrugated flow path; (d) removing water from the grape juice; and (e) collecting an concentrated grape juice product that can be used to make a desert wine. The inventive method further comprises recycling the OA by selectively distilling off water to restore the original weight percentage of sugar in the OA. Preferably, the OA further comprises at least 1 mM of an organic acid. The organic acids in the OA are selected from the group consisting or malic acid, citric acid, tartaric acid, and combinations thereof.

In general, it is possible to adjust the relative percentages of removal of water and alcohol from a fermented beverage (i.e., wine, beer or champagne) by adjusting the amount of sugar in the OA. Higher amounts of sugar (i.e., from about 30% to about 85%) in the OA removes water faster than alcohol, whereas lower sugar concentrations (i.e., from about 3% to about 20%) in the OA removes alcohol faster than water creating a low-alcohol beverage. Therefore, the inventive methods are based upon the discovery that it is not necessary to provide an OA consisting of an alcohol-free beverage or a fruit juice. Instead, the OA need only comprise sugar and water with the amount of sugar controlling the relative rates of water and alcohol removal.

BRIEF DESCRIPTION OF THE DRAWINGS

FIG. 1 illustrates a side view of a portion of an osmotic concentration cell. The supports members are straight bars arranged in parallel which extend into and out of the page. In this cell, the distance between support member centers is about 2.5 cm and the height of the support members is about 2 cm. In operation, the pressure difference between the juice and OA is held below 30 psi and the radius of curvature (i.e., deflection) of the membrane between the support members is about 2.0 cm. The flow path is shown by the curving arrow between the membranes. Due to a continual change in flow direction, the flow path induces a high degree of turbulence. The OA flows through a gap between the support members (i.e., second chamber), preferably in a direction perpendicular to the juice flow direction.

FIG. 2 illustrates a diagram of half (bottom portion) of an inventive DOC apparatus. The top portion of the apparatus (not shown) is identical except for positioning of support members, juice inlet and exit ports. The apparatus shown in FIG. 2 is a miniature lab scale pilot model having a top cell and a bottom cell but not having any middle cells. A commercial scale apparatus would have much larger width and length and a greater number of cells (e.g. middle cells), however, the spacing between support members and operating pressures would be similar to the illustrated lab scale model.

DETAILED DESCRIPTION OF THE INVENTION

The present invention provides an osmotic concentration cell and apparatus that have a novel design for flow of a juice providing for high turbulence at a first side of a semipermeable membrane that defines a first chamber. The flow path of the juice to be concentrated is called "corrugated" because there is a continual change in flow path direction. It is this corrugated flow path that provides for a high amount of turbulence at the first side of the membrane and acts to significantly prevent fouling of the membrane. Moreover, presence of suspended solids within the juice can further act as a abrasive agent to continually cleanse the first side of the semipermeable membrane and further prevent membrane fouling.

The present invention provides an osmotic concentration cell and an osmotic concentration apparatus (comprising an array or plurality of osmotic concentration cells), wherein each cell has first chamber with a fluid flow design with high turbulence at a first semipermeable membrane surface by having a flow path of the first chamber with a continual change in flow direction. The osmotic agent (OA) flows on the second side of the semipermeable membrane in a second chamber with a slightly lower pressure than the juice.

The juice, as used herein, refers to any liquid that is to be concentrated by selectively removing water or another species, such as alcohol to create a concentrated juice. In the case of an alcoholic beverage such as wine, the concentrated juice may be a low alcohol wine or a concentrated thin wine. Examples of juices that are concentrated to remove water as the solvent include any fruit juice (e.g., orange, apple, red raspberry, pear, cranberry, guava, grapefruit, lemon, other citrus fruits, tropical fruits or berries), vegetable juices such as tomato or carrot juices, coffees and teas, milk and diary products and specialty juices such as aloe vera, and perfumes and flavoring agents. Further, other juices may be processed to remove other solvents, such as alcohol and/or water from alcoholic beverages, such as beer or wine to create low alcohol beers or wines or premium wines from thin, low-grade wines. Concentration of a juice is determined by the Brix number. Brix is a measure of percentage of dissolved solids. Therefore, selective removal of a solvent from the juice will increase the percentage of dissolved solids and the Brix number.

In order to selectively remove a particular solvent, each osmotic concentration cell is designed comprising an enclosed apparatus having one or two semipermeable membranes per cell, each semipermeable membrane having a first side defining a first chamber and a second side defining a second chamber. The semipermeable membrane wraps around support members (such as rod-shaped support members) spaced from about 1 cm to about 10 cm apart, wherein the support members are within the second chamber. Preferably, each cell further comprises a sealing device, such as an O-ring that surrounds the semipermeable membrane to seal it and prevent leakage of liquid contents around the semipermeable membrane. The apparatus and cell is made from a rigid material suitable to contact for the particular juice and OA that flows within the cell or apparatus. If food juices are being concentrated, examples of suitable rigid materials include stainless steel, polycarbonate, or other food-grade polymeric materials. The juice preferably contacts only the first surface of the semipermeable membrane and not the material that forms the walls of the cell or apparatus.

The semipermeable membrane is either hydrophobic for non-aqueous juices or hydrophilic for aqueous juices. Examples of hydrophilic membranes include membranes composed of cellulose acetate, cellulose triacetate, polysulfones, other polymeric hydrophilic materials, and composite membranes formed from combinations of the foregoing materials.

There is a pressure difference between the juice or first chamber and the OA or second chamber wherein the pressure is greater in the first chamber to provide membrane deflection within the second chamber between the support members to provide a first chamber juice flow path with a continually changing direction. The maximum pressure difference between the first chamber and the second chamber varies in inverse proportion to the distance between the support members. This flow path is called "corrugated." The juice flow path is continually changing, in a serpentine pattern, wherein the radius of curvature of the juice flow path is from about 1.5 cm to about 4.5 cm depending upon the distance between the support members. Preferably, the radius of curvature is about 2.0 cm. For example, when there is a 2.5 cm. or 1 inch spacing between support members, appropriate pressure differences between the first and second chambers is from about 1 to about 30 psi with a cellulose triacetate membrane.

Figure 7:
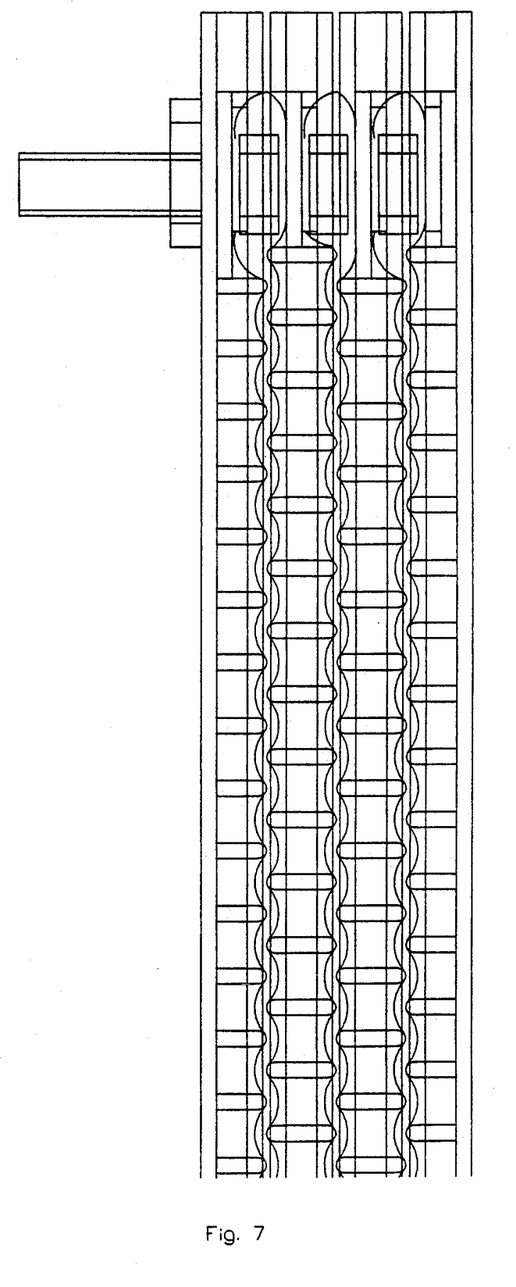
FIG. 7 shows a stacking design to stack a plurality of modules in a relatively small area.

The osmotic concentration apparatus further comprises one or a plurality of enclosed cells having a flow inlet opening leading to the first chamber of each cell, a flow outlet communicating with the first chamber of each cell, an OA inlet and an OA outlet connected to each second chamber. The second chamber of an osmotic concentration apparatus is defined by internal walls of the osmotic concentration apparatus and the second sides of the semipermeable membranes. Preferably, the apparatus is composed of a plurality of stackable module cells. The top and bottom cells comprise the outer walls of the apparatus and one or a plurality of middle cells comprise the middle modules. The middle modules, or cells have no outer walls, but instead have a frame support holding the parallel support members. The semipermeable membranes are placed inside the rows of support members and sealed into place with an appropriate sealing device, such as an O-ring or with an adhesive agent. The semipermeable membranes can be replaced when the modular apparatus is disassembled into its component modules. Each module can be stacked to reduce total area of the apparatus. An example of one stacking arrangement of three modules is shown in FIG. 7.

The apparatus can be operated in a horizontal, inclined, or preferably, in a vertical orientation. The advantage of vertical orientation is easier removal of bubbles as well as easier assembly and maintenance.

The support members are arranged in parallel to support formation of a "corrugated" flow path with each first chamber when greater pressure is applied to the first chamber to deflect the semipermeable membrane into the second chamber. The support members can be any shape so long as there is a rounded surface contacting the second side of the semipermeable membrane. Examples of appropriate shapes are rods, rounded cones or boxes with at least one rounded face.

The osmotic agent (OA) is designed to osmotically pull the selected solvent (usually water for fruit or vegetable juices or ethanol for beer or wine) from the juice into the OA. The osmotic pressure is initially greater for solutes (e.g., salts, sugars, glycols, and organic volatile agents such as flavors or perfume ingredients) in the OA. The composition of the OA depends upon the particular juice to be concentrated and what are the solutes in solution in the juice. For example, the OA for fruit or vegetable juices can comprise sugars, such as high fructose corn syrup. The question of whether the sugars from the OA migrate into the concentrated juice was investigated by monitoring the stable carbon isotope ratios in the juice and the OA. The ratios of the OA sugar and juice sugar naturally differ to a great extent. It was found that the ratios did not change during the inventive juice concentrating process. Therefore, sugars did not cross the membrane. In the case of lowering the alcohol (ethanol) content of a delicate beverage such as a wine, it is important to not remove flavoring agents. In premium wines, flavoring agents include organic acids such as malic, citric and tartaric acids. The OA should contain less than about 75 weight % sugar.

The OA should be recycled by evaporating the selected solvent removed from the juice. Preferably, from about 1% to about 3% citric acid or ascorbic acid (by weight) is added to the OA to prevent caramelization of any sugars present in the OA during evaporation. The OA only is heated, thus allowing cold concentration of a juice to prevent breakdown of any heat sensitive components in a juice. The result of the Inventive DOC process using the inventive cell or apparatus is a higher quality concentrated juice that retains its flavor characteristics better that a similar juice concentrated by an evaporative process. Further, the high turbulence at the first side of the semipermeable membrane prevents membrane fouling and leads to longer lasting membranes with more infrequent membrane changes to provide a more cost effective and higher quality juice concentration process.

The present invention further comprises a DOC method for removing a selected solvent from a juice in an osmotic concentration cell or apparatus, comprising: (a) providing a juice in a continuous flow stream to a juice inlet, (b) pumping the juice at a rate of from about 1 to about 30 psi through a first chamber and out a juice outlet, wherein the first chamber comprises a continually changing direction flow path, wherein the radius of curvature of the continually changing direction flow path is from about 1.5 cm to about 4.5 cm., (c) providing an OA in a second chamber, wherein the second chamber is defined by the second side of a semipermeable membrane and enclosed by the cell, and wherein the OA comprises the salt components of the juice at a molar concentration at least three times and preferably at least five times greater than the undiluted juice. Preferably, the OA further comprises at least 50 weight % of a sugar, wherein the sugar is selected from the group consisting of sucrose, fructose, maltose, glucose, and combinations thereof.

One surprising feature of the inventive apparatus is an ability to concentrate a thin, low grade wine into a premium wine by removing both alcohol and water from the beverage. When wine is upgraded in this manner, the relative percentage of alcohol within the beverage is usually constant. However, OA's with higher sugar concentrations, such as 60 weight % or higher are needed. Moreover, lower quality grape juice used for fermenting into wine can be upgraded by concentrating according to the inventive process with a sugar concentration in the starting OA of at least 50 weight % and preferably 65 to 80 weight %. Therefore, the inventive method using the inventive apparatus can improve wine quality by upgrading lower grade wines (by virtue of a thin body and concentration of favoring agents) into a higher quality wine. This feature is a great significance to the wine industry.

It has been found that a much superior product is made when the product is concentrated slightly (about 5% to about 20%). To accomplish this, a dealcoholized OA with a higher osmotic potential than the full-alcohol beverage must be used (e.g., a sugar solution). The degree of concentration the product will experience can be adjusted by selecting an appropriate osmotic strength (brix) of the OA. After processing, the alcohol can be removed from the OA by distillation. Flavors permeating the membrane into the OA can be stripped off before alcohol removal and added back to the OA before the next cycle in order to bring them into balance with the product. In most cases, however, this is unnecesary. Concentration of the product more than compensates for any flavors lost through the membrane.

The present invention further comprises a method for improving the quality of a thin, low grade wine, comprising: (a) providing a thin, low grade wine composition to a juice inlet in an osmotic concentration apparatus described herein; (b) providing an OA to the OA chamber, wherein the OA comprises from about 8% to about 15% by weight of a sugar; (c) applying greater pressure to the wine than to the OA to deflect the semipermeable membrane into a corrugated flow path; (d) removing approximately equal percentage amounts of both alcohol and water; and (e) collecting an improved wine product. The inventive method further comprises recycling the OA by selectively distilling off alcohol and water to restore the original weight percentage of sugar in the OA. Preferably, the OA further comprises at least 1 mM of an organic acid. The organic acids in the OA are selected from the group consisting or malic acid, citric acid, tartaric acid, and combinations thereof.

The present invention further provides a process for improving the quality of a fruit juice used to make a wine, comprising: (a) providing a thin, low grade fruit juice composition to a juice inlet in an osmotic concentration apparatus described herein; (b) providing an OA to the OA chamber, wherein the OA comprises from about 50% to about 75% by weight sugar; (c) applying greater pressure to the fruit juice than to the OA to deflect the semipermeable membrane into a corrugated flow path; (d) removing water from the fruit juice; and (e) collecting an improved fruit juice product. The inventive method further comprises recycling the OA by selectively distilling off water to restore the original weight percentage of sugar in the OA. Preferably, the OA further comprises at least 1 mM of an organic acid. The organic acids in the OA are selected from the group consisting or malic acid, citric acid, tartaric acid, and combinations thereof.

The present invention further provides a process to make a grape juice that can be used for a desert wine by concentrating the grape juice to about 36 to about 40 degree Brix from a grape juice from "fully ripe" grapes (i.e., approximately 23 degrees Brix) by a process comprising: (a) providing a grape juice composition from fully ripe grapes to a juice inlet in an osmotic concentration apparatus described herein; (b) providing an OA to the OA chamber, wherein the OA comprises from about 50% to about 80% by weight sugar; (c) applying greater pressure to the grape juice than to the OA to deflect the semipermeable membrane into a corrugated flow path; (d) removing water from the grape juice; and (e) collecting an concentrated grape juice product that can be used to make a desert wine. The inventive method further comprises recycling the OA by selectively distilling off water to restore the original weight percentage of sugar in the OA. Preferably, the OA further comprises at least 1 mM of an organic acid. The organic acids in the OA are selected from the group consisting or malic acid, citric acid, tartaric acid, and combinations thereof.

In general, it is possible to adjust the relative percentages of removal of water and alcohol from a fermented beverage (i.e., wine, beer or champagne) by adjusting the amount of sugar in the OA. Higher amounts of sugar (i.e., from about 30% to about 75% for a dealcoholized OA, and as little as 5% for an alcoholized OA) removes water faster than alcohol, whereas lower sugar concentrations (i.e., from about 3% to about 20%) in the OA removes alcohol faster than water creating a low-alcohol beverage. Therefore, the inventive methods are based upon the discovery that it is not necessary to provide an OA consisting of an alcohol-free beverage or a fruit juice. Instead, the OA need only comprise sugar and water with the amount of sugar controlling the relative rates of water and alcohol removal.

A novel feature of the inventive osmotic concentrator cell is controlled deflection of the semipermeable membrane between support members to provide a flow path with continually changing direction and a high amount of turbulence on the first side of the membrane. This provides for an osmotic concentration cell that can concentrate liquids with gel forming dissolved solids, such as aloe vera or orange juice with pulp that could not otherwise be concentrated in DOC or RO systems.

Figure 1:
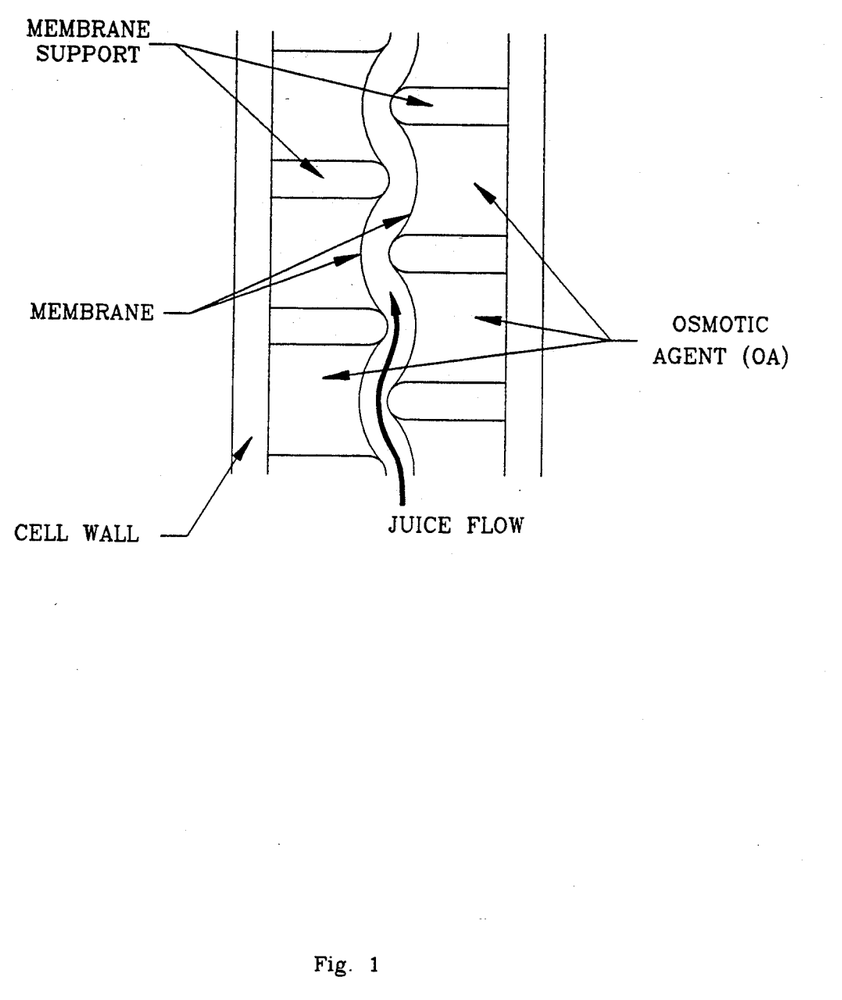

A diagram of a section of a cell is provided in FIG. 1. The product being concentrated flows along the first side of a semipermeable membrane that is deflected between two sets of support members by virtue of a higher pressure in the first chamber than in the second chamber. Due to the offset positioning of each set of parallel support members, a corrugated flow pattern is formed in the first chamber. The continuous direction changes for the flow produces a high amount of turbulence art the side of the semipermeable membrane, the side most prone to fouling. To improve reliability and allow the use of even thinner membranes, a sheer fabric support can be used as a backing on the second side of the membrane. This support can be either attached to the frame or fused with the membrane.

In addition to high turbulence, the inventive design also reduces membrane stress and susceptibility to bursting. This is important because thin membranes are preferred for DOC systems. According to U.S. Pat. No. 3,228,877, resistance of a membrane to pressure induced bursting is inversely related to the membrane radius of curvature. Therefore a deflection to form a radius of curvature from about 1 to about 4 cm, and preferably from about 2 to about 3 cm, allows the inventive osmotic concentrator cell and apparatus to use extremely thin membranes.

Figure 2:
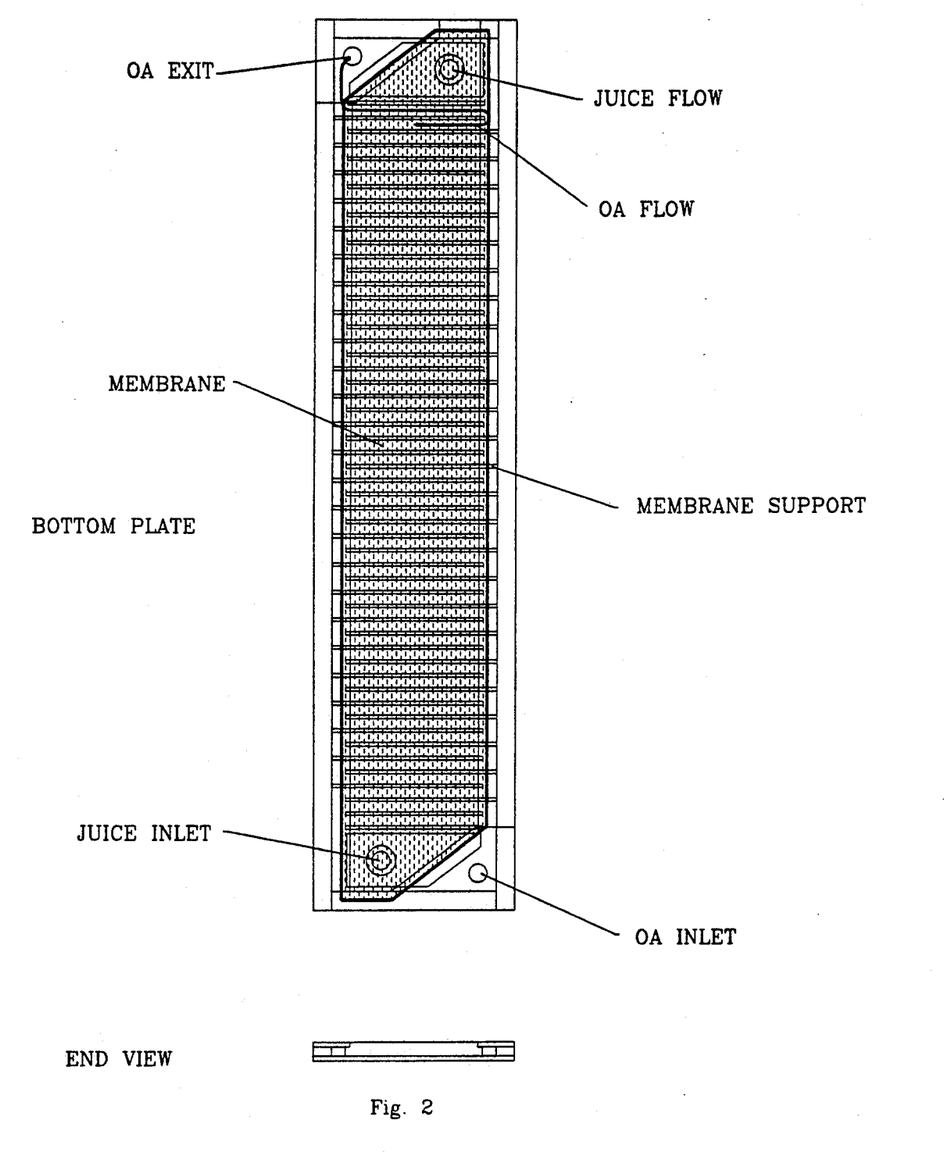
Figure 3:
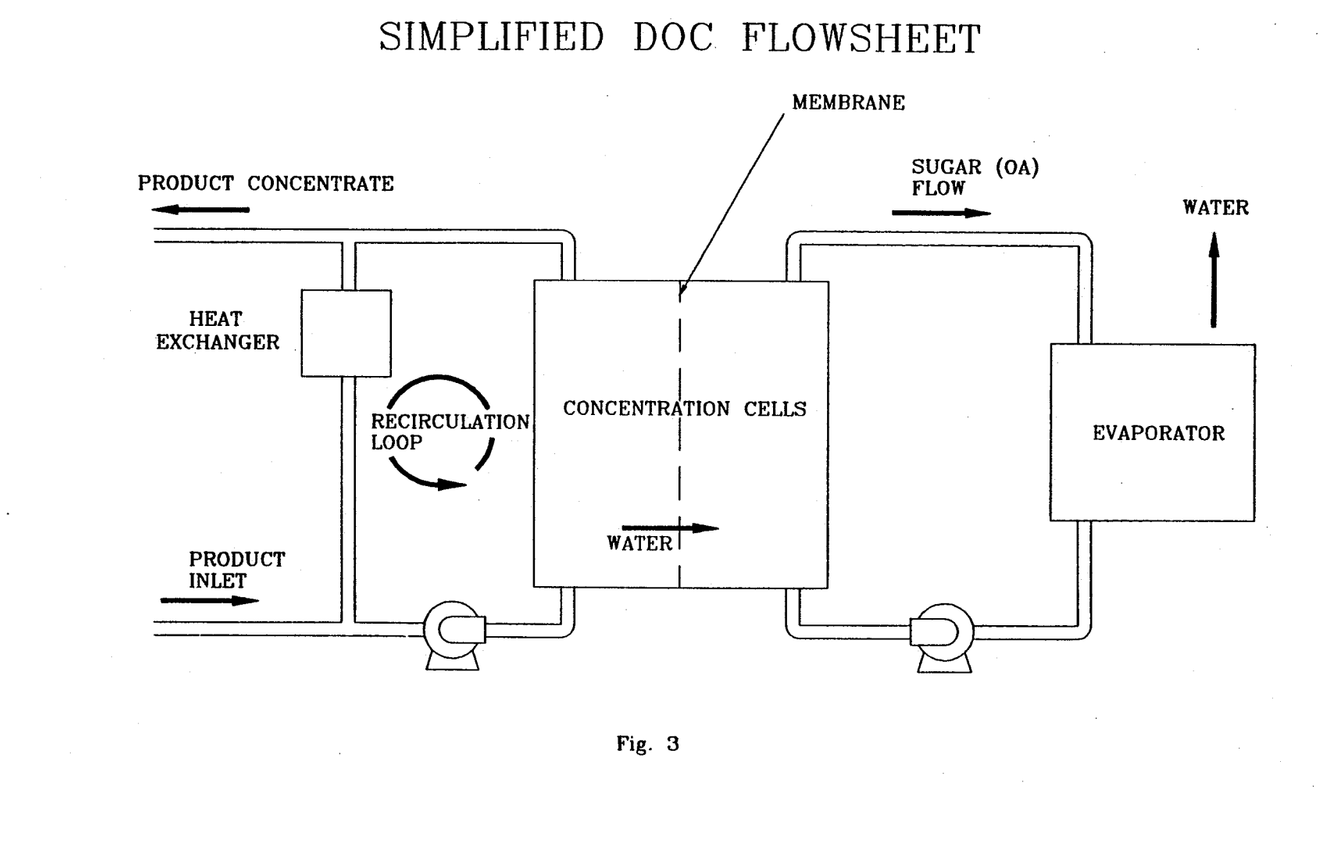
FIG. 3 is a schematic diagram of the inventive direct osmotic concentration (DOC) process to concentrate a juice and remove water from the OA by a evaporation process.

The design of the osmotic concentration cells allows for construction of an osmotic concentration apparatus in a plate and frame type structure. A plate and frame structure allow for the use of relatively inexpensive sheet semipermeable membranes and allows for rapid instillation and replacement of membranes. Such a design is shown in FIG. 7. A diagram of the flow paths of an osmotic concentration apparatus is shown in FIG. 2. The OA flows in second chambers in a tortuous path between support members in the same net direction as the flow. Preferably, membrane seals to prevent leakage between the flow chambers and the OA chambers are made by compressing ends of membranes between gaskets (i.e., O-rings) mounted to boxes in the OA chambers.

EXAMPLE 1

This example illustrates the construction of a pilot scale prototype of the inventive DOC apparatus comprising one cell consisting of a top module and a bottom module that was made for conducting the following experiments to concentrate different juices. Additionally, middle modules to create a plurality of cells in an apparatus was made to increase the efficiency of the apparatus by creating additional first chambers to increase the throughput of the DOC apparatus.

The top module and bottom module are mirror image components (except for offset placement of the support members, i.e., rods) in a rectangular shape. The pilot model was made of polycarbonate in a 28 cm by 100 cm rectangular dimension. Each component is 2.5 cm thick and the interior space houses the parallel rod-shaped support members, also made of polycarbonate affixed by solvent fusing. The support membranes were placed 2.5 cm apart. The interior space is rectangular-shaped and encircled by an O-ring to help seal the membrane. A cellulose triacetate semipermeable membrane having a 100 molecular weight cutoff was placed on each interior, rectangular space such that it slightly overlaps the interior space and is sealed together to form the first chamber when the top and bottom modules are joined to form a DOC cell having one first chamber and two second chambers.

A middle module was made comprising a polycarbonate rectangular frame of the same dimensions as the top and bottom modules. The interior space of the middle module comprises a row of parallel support members having curved surfaces extending from either side of the middle module. The support members were placed 2.5 cm apart. Further there is a sealing means (i.e., O-rings) surrounding the interior space on both sides of the middle module. Two semipermeable membranes are placed on either side of the interior space of the middle module when the apparatus is assembled. The result is a stackable apparatus with a top, bottom and middle modules having two first chambers and three second chambers. Additional middle modules will increase the number of first chambers and second chambers by one.

The clear plastic (polycarbonate) cells allows for visualization of juice and OA flows and determination is there are difficulties with bubbles and the like. Also, the entire apparatus can be moved to a temperature-controlled room, such as a cold room to help preserve the juice from heat degradation or microbial contamination. Alternatively, the apparatus can be jacketed to control temperatures within the apparatus by pumping an appropriate temperature liquid through the jacket.

EXAMPLE 2

This example illustrates concentration of an orange juice using the inventive pilot scale apparatus described in Example 1. Approximately 6 liters of fresh orange juice, Brix 12.6, was obtained. Approximately 6 gallons of OA was prepared with 100% PEG (polyethylene glycol) MW 300. The module had a length of 61 inches, 100 molecular weight cutoff triacetate membrane, and 90 μm membrane thickness.

Figure 4:
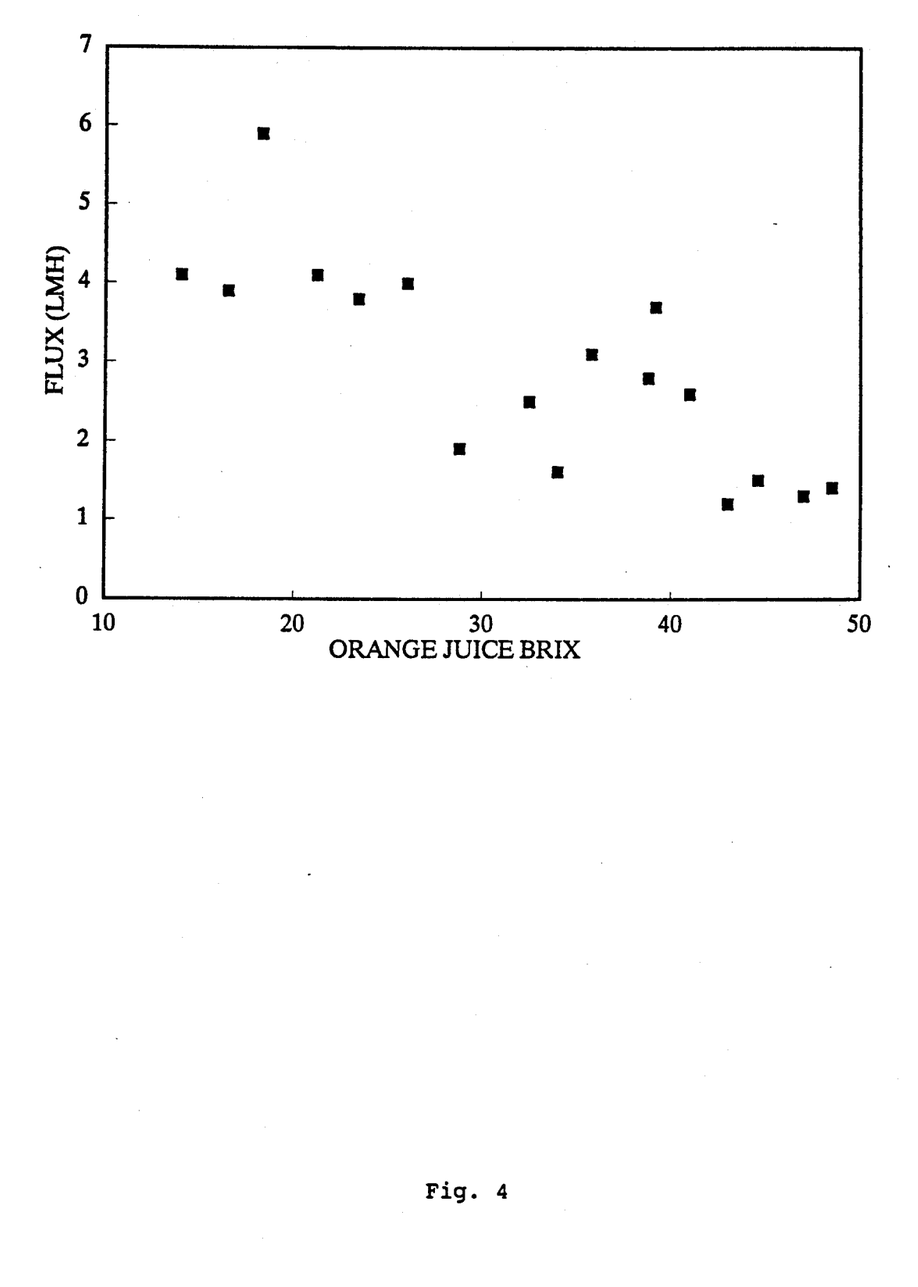
FIG. 4 shows a graph of water flux rate from orange juice during a concentration process described in Example 2 herein. A least squares analysis shows that the rate of concentration was linear with time indicating that there was no significant membrane fouling that could impede performance of the apparatus.

FIG. 4 shows a graph of flux time versus Brix of the orange juice. The orange juice was concentrated to about 50 Brix by transferring water from the orange juice to the OA. The rate of concentration was about linear with time indicating that there was not a significant membrane fouling problem that could impede performance of the apparatus. The Brix of the OA decreased correspondingly. Accordingly, orange juice with a high suspended solids content due to a high content of pulp, can be significantly concentrated in the inventive apparatus to almost five times more concentrated without fouling the membrane surface. Conventional DOC or RO processes would have experience significant membrane fouling with a high suspended solids content orange juice that could not have economically produced high quality orange juice concentrate.

EXAMPLE 3

Figure 5:
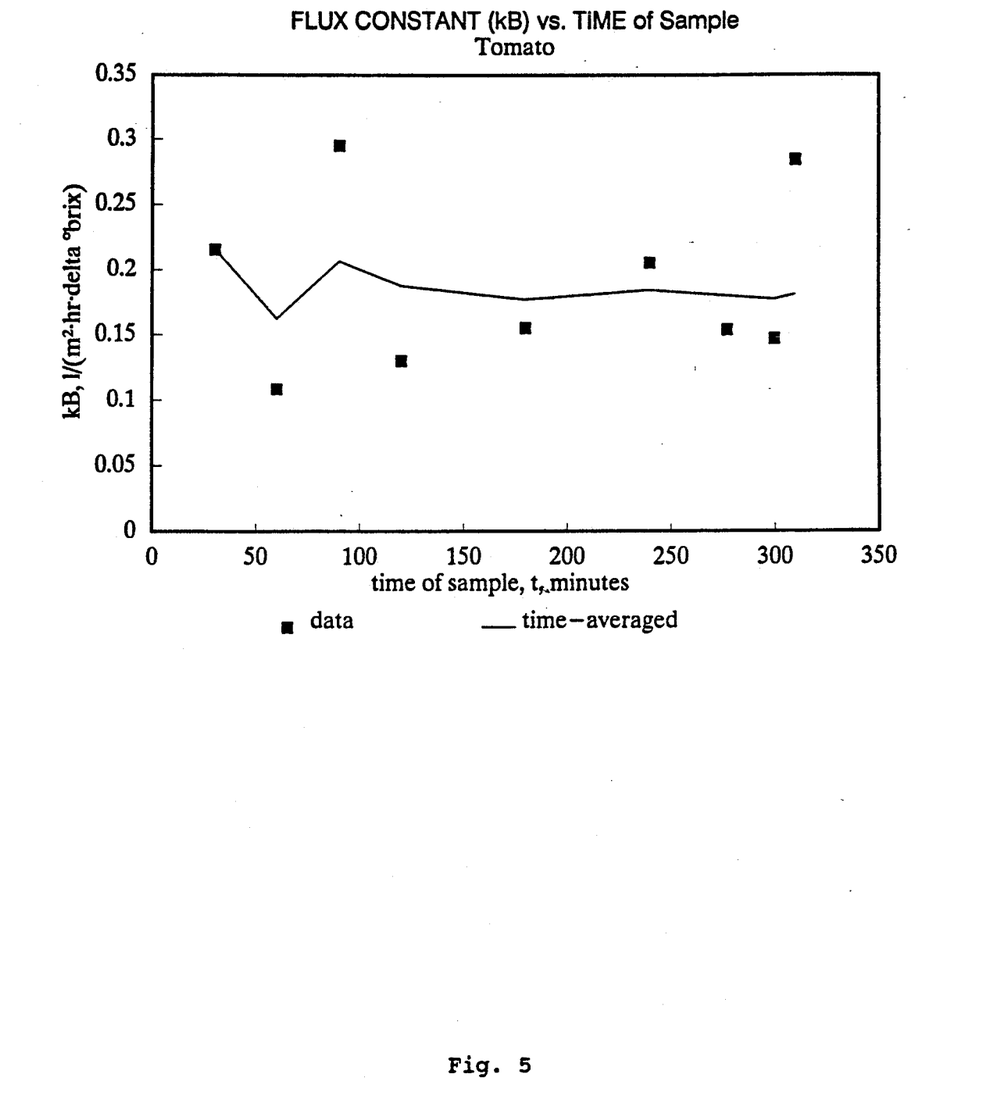
FIG. 5 shows a graph of flux constant versus time of concentration measuring either the tomato juice or the OA. The line for flux of water into the OA is relatively linear over time, indicating that there is very little, if any, membrane fouling.

This example illustrates concentration of a tomato juice using the inventive pilot scale apparatus described in Example 1. Approximately 2.3 gallons of tomato juice, Brix 6.0, was obtained from Nestle. Approximately 4.0 gallons of OA (high fructose corn syrup), Brix 75.9, were used. FIG. 5 shows a graph of a flux constant versus time of concentration measuring either the juice or the OA. This graph shows that the flux of water into the OA is relatively linear over time, indicating that there is very little, if any, membrane fouling.

EXAMPLE 4

This example illustrates concentration of coffee as a step in the production of instant coffee or liquid coffee concentrates. Successive coffee batches have been concentrated from 5 Brix to between 56 and 63 Brix using 60-70 Brix HFCS (high fructose corn syrup—55% fructose, 42% glucose, 3% sucrose) as the OA. A single cell and single set of membranes was used for these experiments. The membranes were cleaned every 8 to 10 hours of use by flushing with water for 5 to 15 minutes. After this flushing, no coffee deposits were visible inside the cell (made from a clear plastic material). The cell was cleaned between batches with a 5 minute recirculation with ULTRASIL cleaner followed by a water rinse.

Figure 6:
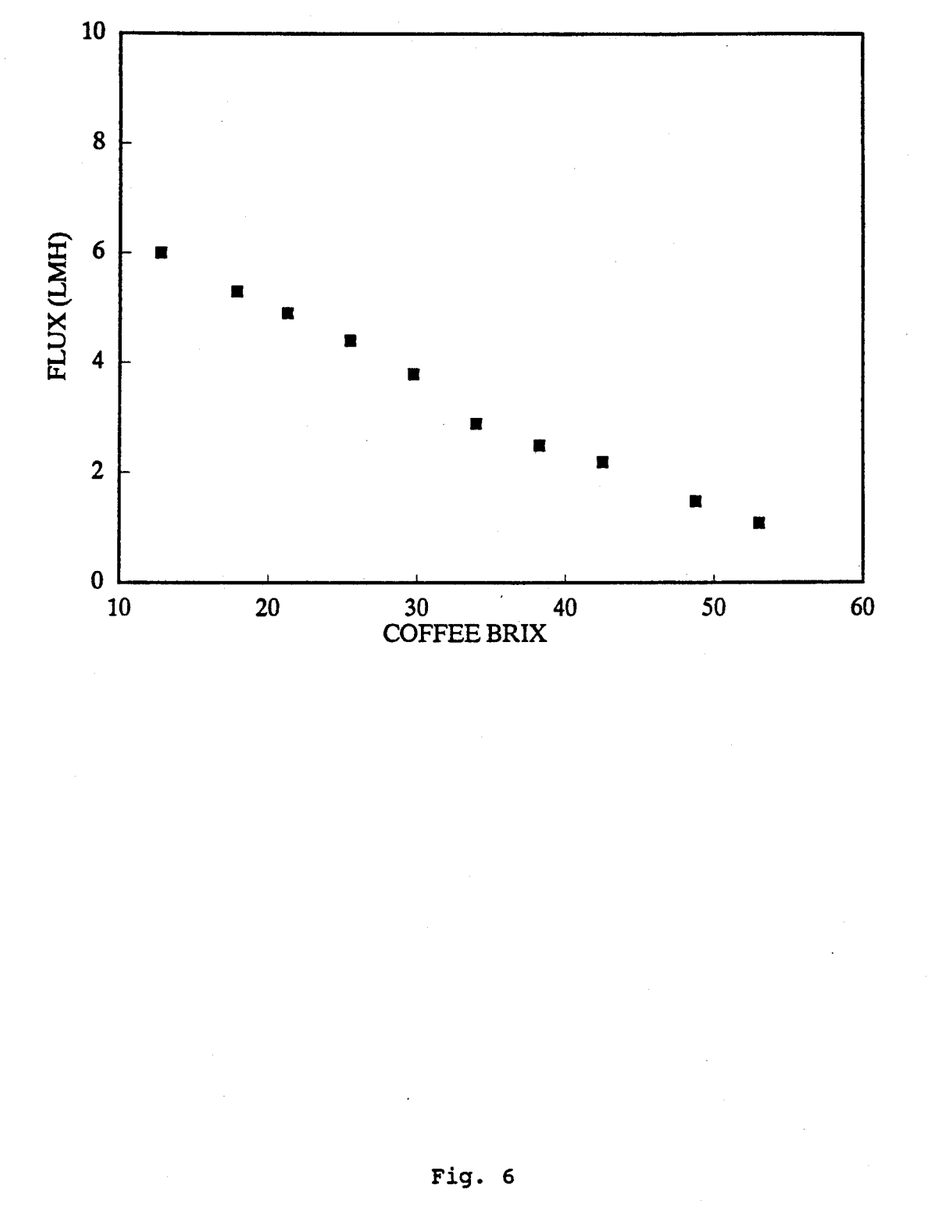
FIG. 6 shows flux from concentrating coffee described in Example 4 herein. The Brix numbers for coffee increased linearly.

The total run times for these experiments were 150 hours. Flux rates were found to vary with coffee concentration as shown in FIG. 6. Flux declines with times (a measure of fouling rate) was minimal. By periodic addition of single strength coffee, 20 Brix coffee was run for 8 hours during which time no flux decline was measured. A similar run with 45 Brix coffee showed a decline of around 20% over six hours. The rates shown in Table 1 below are composite values from several batches.

It was further determined whether or not the coffee was adulterated in any way during the concentration procedure by conducting high performance liquid chromatography (HPLC) analysis to examine for sugars. No sugars passed through the membrane as shown in Table 1.

TABLE 1

| | CONCENTRATION (g/100 ml) | | | | |
|---|---|---|---|---|---|
| | unk 1 | glucose | unk 2 | fructose | unk 3 |
| reference sample | 0 | 0 | 0.0951 | 0.3440 | 0 |
| batch 1 (56 Brix) | 0 | 0 | 0.0702 | 0.2136 | 0.1273 |
| batch 2 (40 Brix) | 0 | 0 | 0 | 0.1515 | 0.1345 |

EXAMPLE 5

This example illustrates concentration of a raspberry juice using a HFCS OA. C13 levels in the sugars in the raspberry juice and the OA are shown in Table 2. These data show that no detectable amount of sugar passed from the OA into the juice. Table 2 below provides stable carbon isotope data of red raspberry juice and concentrates and the OA before and after processing.

TABLE 2

Stable carbon isotope data of red raspberry juice and concentrates and the OA before and after DOC processing.

| SAMPLE | del $^{13}C_{PDB}$ |
|---|---|
| FST single strength | −24.9 |
| FST centritherm concentrate | −24.8 |
| Sample A | −24.8 |
| Sample B | −24.9 |
| OA (prior to processing) | −11.2 |
| OA (post-process Sample A) | −11.6 |
| OA (post-process Sample B) | −11.2 |

The data in Table 2 are reported relative to the PDB standard and are accurate to 0.2 mil.

What is claimed is:

1. An osmotic concentration apparatus comprising an enclosed apparatus having outer walls, a flow inlet and outlet connected to a first chamber, an osmotic agent (OA) inlet and outlet connected to a second chamber, and a plurality of concentration cells, wherein each concentration cell comprises a semipermeable membrane having a first side defining a first chamber and a second side defining a second chamber and comprises a plurality of support members arranged in parallel, whereby when fluid pressure is applied to juice within the first chamber at a pressure higher than fluid pressure of the osmotic agent in the second chamber, the semipermeable membrane deflects into the second chamber between the support members, and defining a corrugated flow path within the first chamber.

2. The osmotic concentration apparatus of claim 1 wherein the radius of curvature of the flow path in the first chamber when greater pressure is applied is from about 1.5 cm to about 4.5 cm.

3. The osmotic concentration apparatus of claim 1 wherein the radius of curvature of the flow path is about 2.0 cm.

4. The osmotic concentration apparatus of claim 1 wherein the semipermeable membrane comprises a polymeric material selected from the group consisting of hydrophobic and hydrophilic semipermeable membranes and having a thickness of from about 0.02 mm to about 0.2 mm.

5. The osmotic concentration apparatus of claim 1 wherein the distance between support members is from about 1 cm to about 10 cm.

6. The osmotic concentration apparatus of claim 5 wherein the distance between support members is from about 2 cm to about 5 cm.

7. The osmotic concentration apparatus of claim 1 wherein the membrane is further supported by a flexible fabric on the second side of the membrane.

8. A method for direct osmotic concentration (DOC) of a juice, comprising:
    (a) providing a juice in a continuous flow stream to a juice inlet of an osmotic concentration apparatus comprising an enclosed apparatus having outer walls, a flow inlet and outlet connected to a first chamber, an osmotic agent (OA) inlet and outlet connected to a second chamber, and a plurality of concentration cells, wherein each concentration cell comprises a semipermeable membrane having a first side defining a first chamber and a second side defining a second chamber and comprises a plurality of support members arranged in parallel, whereby when fluid pressure is applied to juice within the first chamber at a pressure higher than fluid pressure of the osmotic agent in the second chamber, the semipermeable membrane deflects into the second chamber between the support members, and defining a corrugated flow path within the first chamber;
    (b) pumping the juice at a rate of from about 0.01 m/sec to about 2 m/sec through the first chamber in the osmotic concentration cell; and
    (c) providing an osmotic agent in the second chamber and pumping the osmotic agent at a rate of from about 0.01 m/sec to about 1 m/sec.

* * * * *